United States Patent [19]
Parsons

[11] Patent Number: 5,443,430
[45] Date of Patent: Aug. 22, 1995

[54] SPUR GEAR DIFFERENTIAL FOR A VEHICLE

[75] Inventor: Frederick L. Parsons, Pearce, Ariz.

[73] Assignee: Neuberne H. Brown, Jr., Frankford, W. Va.; a part interest

[21] Appl. No.: 236,999

[22] Filed: May 2, 1994

[51] Int. Cl.⁶ .............................................. F16H 48/10
[52] U.S. Cl. ................................................. 475/248
[58] Field of Search ......................................... 475/248

[56] References Cited

U.S. PATENT DOCUMENTS

| | | |
|---|---|---|
| 1,225,842 | 5/1917 | Mennie . |
| 1,312,856 | 8/1919 | Leonard . |
| 1,756,939 | 5/1930 | Crawford . |
| 1,918,864 | 7/1933 | Priest . |
| 2,648,236 | 8/1953 | Wilson . |
| 4,762,023 | 8/1988 | Ivy . |
| 5,171,194 | 12/1992 | Shen .................................. 475/330 |

FOREIGN PATENT DOCUMENTS

| | | |
|---|---|---|
| 829467 | 5/1938 | France . |
| 2148418 | 5/1985 | United Kingdom . |

Primary Examiner—Dirk Wright
Attorney, Agent, or Firm—Brumbaugh, Graves, Donohue & Raymond

[57] ABSTRACT

A differential for transmitting rotational power to the left and right axles of a vehicle. Loss of adhesion by one drive wheel is countered by the other drive wheel maintaining traction through the independent action of its one-way drive configuration. Differential balance between the two wheels is accomplished by the high feedback forces from the ground overcoming the gear set locking action, thus enabling the wheels to balance the driving torque in the usual manner. If one of the drive wheels loses traction, the differential configuration enables torque to be continuously delivered to the other drive wheel, with no time gap occurring between slippage and delivery of torque to the drive wheel having traction. Inherent in the present invention is a corrective gear ratio bias which counters the effects of torque steer at all speeds and driving conditions. The inventive differential does not use slip clutches, which tend to wear out over time, or complex and costly traction control systems.

15 Claims, 3 Drawing Sheets

SPUR GEAR DIFFERENTIAL FOR A VEHICLE

FIELD OF THE INVENTION

The present invention relates to a vehicle differential, and, particularly to a differential that can be configured to produce a greater torque at one axle and a corresponding lesser torque at the other axle.

BACKGROUND OF THE INVENTION

If a vehicle was always driven in a straight path without having to make any turns, differentials would not be required, however, when an automobile makes a turn, the outside drive wheel must travel significantly farther than the inside wheel, thus requiring the outside wheel to rotate at a higher rate of speed than the inside wheel. A differential solves this problem by allowing the outside and inside wheels to rotate at the same rate when the vehicle is traveling straight ahead, but at a different rate when turns are made. Most standard differentials have been designed to deliver equal amounts of torque to each driven wheel; however, if one of the wheels loses traction, e.g., slips on ice, then the other wheel cannot deliver torque. Accordingly, many cars are now equipped with devices to prevent this problem.

One of these devices, the limited slip differential, is similar in construction to the standard differential, but, in addition, it uses clutch plates to prevent a wheel which has lost traction from spinning wildly. These clutch plates restrain the spinning axle and as a result, if one wheel loses traction temporarily, the other will not spin out of control, thereby ensuring that torque is still supplied to the non-spinning wheel.

Although the limited slip differential has served a purpose, it has not proven to be satisfactory under all conditions. For example, a small amount of slippage occurs between the time one of the wheels begins to slip and before the clutch plates lock onto the axle. As a result, the driver momentarily loses optimal control of the vehicle. Another problem which occurs is that a limited slip differential tends to wear out over time, thereby reducing its effectiveness and requiring costly replacement. Finally, the complexity of the limited slip differential adds significantly to the purchase and maintenance costs of a vehicle.

A second attempt to tackle this problem has resulted in the development of traction control systems which utilize on-board computers. With these systems, when slippage occurs at one of the drive wheels, a signal is sent to the system's computer. Reacting to the signal, the computer activates a brake on the slipping wheels, thereby enabling the companion wheel to transmit torque. The problem with this arrangement is that slippage must occur before the system is activated. As a result, during the most critical point of the operation, the point at which slippage occurs, the system does not operate.

Another attempt to solve the problems encountered with the limited slip differentials is seen in the Torsen drive. The configuration of the Torsen drive, consisting substantially of worm gears, ensures that sufficient power is delivered to each wheel at all times. For straight-ahead operation, on surfaces having equal coefficients of friction, torque is delivered to each wheel at a 50-50 ratio. As traction is lost, the wheels are provided power in proportion to their ability to grip the road. Although differentials of the Torsen drive-type have proven to operate effectively, the complexity of the gears and its expense have discouraged commercial use.

A final method for controlling loss of traction is with the locking differential, however, its operating characteristics are such that it has very little usage.

SUMMARY OF THE INVENTION

One object of the present invention to provide a cost effective differential which produces traction at the driving wheels without utilizing slip clutches or complex traction control systems. Another object is to provide a differential which has no time lag between loss on adhesion by one wheel and the full transfer of torque to the other wheel. It is also desired to provide a differential which can be easily substituted for the existing differential on a vehicle. A further object is to provide a means whereby torque steer, a phenomenon that typically occurs when front-wheel drive vehicles are operated at high loads, is neutralized due to the counter torque forces inherent in the system.

To fulfill the foregoing objects, the invention comprises a differential for transmitting rotational power to the left and right axles of a vehicle whereby the torque output between the right and left axles can be biased or varied. The differential includes a differential housing which rotates about a central axis and which is located between the left and right axles of the vehicle. Power is transmitted to the housing via a drive shaft and drivably connected pinion gear. The pinion gear meshes with a ring gear rigidly attached to the external circumference of the housing so that when the pinion gear drives the ring gear, the ring gear and the housing rotate simultaneously.

The housing has spaced left and right walls which are transverse to the central axis. Sections of the left and right axle, coaxial with a central axis and which rotate relative to the housing, extend through the left and right walls of the housing, respectively.

Disposed within the housing are a number of gears which serve to differentiate the rotation of the left axle and the right axle. These gears include sun gears: a right sun gear and a left sun gear coaxial with the central axis and drivably connected to the right and left inner walls of the housing, respectively; and center-left and center-right sun gears drivably connected for concurrent rotation about the central axis and disposed between the left and right sun gears via a floating shaft. The floating shaft, coaxial with the central axis, supports the center-left sun gear and the center-right sun gear and it is disposed between the left and right axles.

Other gears within the housing include planet gears: two or more right planet gears uniformly spaced about and meshing with the right sun gear and rotatable around the circumference thereof; two or more center-right planet gears uniformly spaced about and meshing with the center-right sun gear and rotatable around the circumference thereof; two or more center-left planet gears uniformly spaced about and meshing with the center-left sun gear and rotatable around the circumference thereof; and two or more left planet gears evenly spaced about and meshing with the left sun gear and rotatable around the circumference thereof.

Each right planet gear is paired with an associated center-right planet gear so that each pair is drivably connected to a common right shaft for concurrent rotation. The right shaft is drivably connected to the right axle via a right extension.

Each left planet gear is paired with an associated center-left planet gear so that each pair is drivably connected to a common left shaft for concurrent rotation. The left shaft is drivably connected to the left axle via a left extension.

The gears on the left side of the housing comprise a left-hand gear set. The left-hand gear set includes the left sun gear, the two or more left planet gears, the two or more center-left planet gears and the center-left sun gear. Rotation of the left-hand gear set drives the left axle.

The gears on the right side of the housing comprise a right-hand gear set. The right-hand gear set includes the right sun gear, the right planet gear, the center-right planet gear and the center-right sun gear. Rotation of the right-hand gear set drives the right axle.

One feature of the present invention is to provide for a non-slip differential which does not require slip clutches or complex gearing.

Another feature of the present invention is to provide for a simple mechanical differential which operates at all times, with no interim time period between wheel slippage and commencement of the limited slip gear means, thereby providing optimum drive characteristics per wheel.

Still another feature of the present invention is to provide a differential for a front-wheel drive vehicle which prevents torque steer from occurring at extreme loads. Torque steer in certain front wheel drive vehicles is always present but is not experienced until the vehicle reaches a state of maximum biased torque where corrective effort by the driver is required. Inherent in the present invention is a corrective gear ratio bias which counters the effects of torque steer at all speeds and driving conditions.

BRIEF DESCRIPTION OF THE DRAWING

Further objects and advantages of the invention will be apparent from the following description of an exemplary embodiment thereof, taken in conjunction with the accompanying drawings, in which.

DETAILED DESCRIPTION

The improvement realized by the inventive differential is based upon a simple gear train principle which dictates that it is easier for a smaller gear to drive a larger gear than for a larger gear to drive a smaller gear. In accordance with this theory, as the size of a driving gear grows larger and larger in comparison to the size of a driven gear, a point is reached at which the larger gear will be unable to rotate the smaller gear and "gear lockup" occurs. At this point the gear train can only be driven "one-way" wherein the smaller gear can drive the larger gear, but the larger gear can not drive the smaller gear.

This "one-way" drive principle has been effectively incorporated into the inventive differential by selecting suitably sized gears and positioning these gears in such a fashion that "gear lockup" occurs when one of the driven wheels slips or loses traction, thereby enabling the wheel with traction to continue receiving torque.

Figure 1:
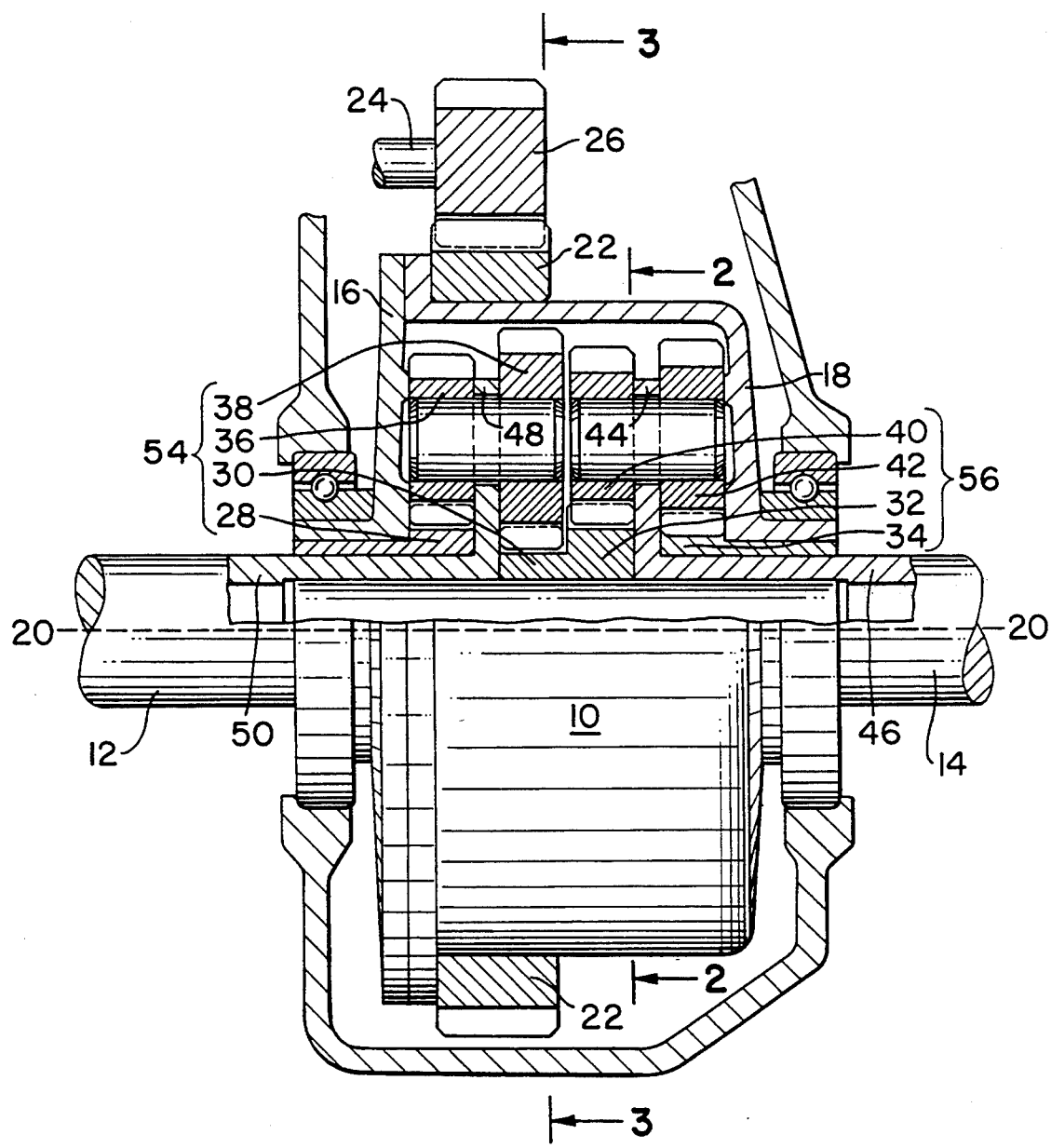
FIG. 1 is a sectional view showing a differential unit constructed in accordance with and embodying the present invention.

In the embodiment of the present invention shown in FIG. 1, a differential housing 10, which is disposed between a left axle 12 and a right axle 14 of a vehicle, has a spaced left wall 16 and a right wall 18. The housing 10 rotates about a central axis 20 and is drivably connected to an external ring gear 22. The external ring gear 22 is rigidly attached to the housing 10 for simultaneous rotation.

The ring gear 22, and hence, the housing 10, is driven by an engine output shaft 24. As the engine output shaft 24 rotates, it rotates a pinion gear 26, which in turn drives the ring gear 22.

Disposed within the housing 10 are a multiplicity of sun gears 28, 30, 32, 34, which are coaxial with a central axis 20, and planet gears 36, 38, 40, 42, which generally rotate around the circumference of their associated sun gear. The positioning and size of the various gears can be adjusted, in accordance with an equation to be discussed below, so that the desired "gear lockup" occurs when one of the driven wheels loses traction.

Within the housing, a right sun gear 34 is drivably connected to the right inner wall 18 of the housing 10. The right sun gear 34 meshes with two or more right planet gears 42 and is sized according to Formula A, which is referred to below. The two or more right planet gears 42 rotate around the circumference of the right sun gear 34.

The left sun gear 28 is drivably connected to the left inner wall 16 of the housing 10. The left sun gear 28 meshes with two or more left planet gears 36 and is sized according to Formula B, which is referred to below. The two or more left planet gears 36 rotate around the circumference of the left sun gear 28.

Figure 2:
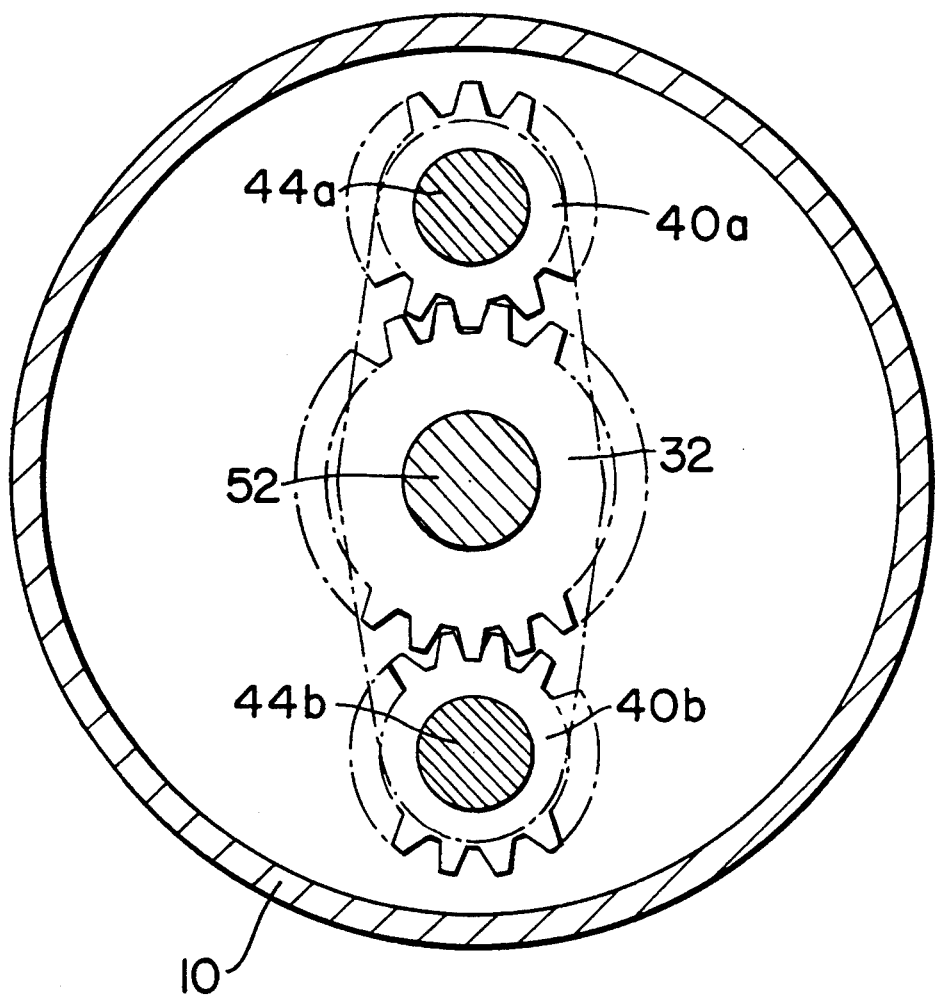
FIG. 2 is a cross-sectional view along line 2—2 showing a differential unit constructed in accordance with and embodying the present invention.
Figure 3:
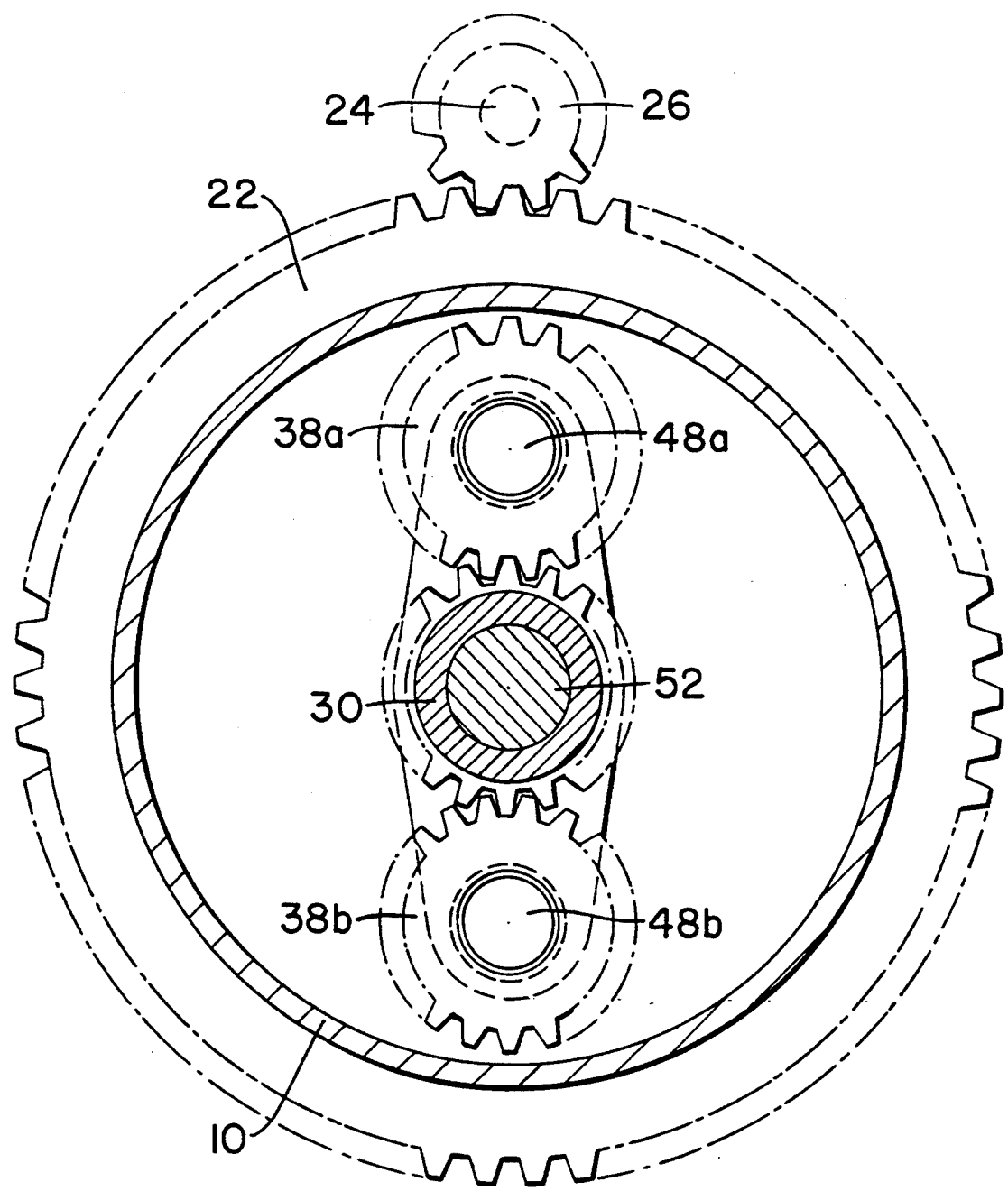
FIG. 3 is a cross-sectional view along line 3—3 showing a differential unit constructed in accordance with and embodying the present invention.

A center-right sun gear 32 and a center-left sun gear 30 are disposed coaxial with the central axis 20 between the left sun gear 28 and the right sun gear 34 via a floating shaft 52 (FIGS. 2 & 3). The floating shaft 52, which is coaxial with the central axis 20, is disposed between the left 12 and right axles 14. The center-right 32 and center-left sun gears 30 are drivably connected for concurrent rotation about the central axis 20. The center-right sun gear 32 meshes with two or more center-right planet gears 40. The two or more center-right planet gears 40 rotate around the circumference of the center-right sun gear 32.

The center-left sun gear 30 meshes with two or more center-left planet gears 38 and is generally smaller than the two or more center-left planet gears 38. The two or more center-left planet gears 38 rotate around the circumference of the center-left sun gear 30.

Each right planet gear 42 is paired with and shares a common axis with an associated center-right planet gear 40, and each pair is drivably connected to a common right shaft 44 for concurrent rotation around the circumference of the right sun gear 34 and the center-right sun gear 32, respectively. Thus, the number of right shafts 44 equals the number of right planet gear 42/center-right planet gear 40 pairings. In turn, each right shaft 44 is drivably connected to the right axle 14 via a right extension 46 of the right axle 14.

Each left planet gear 36 is paired with and shares a common axis with a corresponding center-left planet gear 38, and each pair is drivably connected to a common left shaft 48 for concurrent rotation around the circumference of the left sun gear 28 and the center-left sun gear 30, respectively. Thus, the number of left shafts 48 will equal the number of left planet gear 36/center-left planet gear 38 pairings. Each left shaft 48 is drivably connected to the left axle 12 via a left extension 50 of the left axle 12.

The configuration of the left sun gear 28, the two or more left planet gears 36, the two or more center-left planet gears 38, and the center-left sun gear 30 comprise the gears on the left-hand side of the housing 10, namely, a left-hand gear set 54. Rotation of the left-hand gear set 54 will cause rotation of the left axle 12. Conversely, the configuration of the right sun gear 34, the two or more right planet gears 42, the two or more center-right planet gears 40, and the center-right sun gear 32 comprise the gears on the right-hand side of the housing 10, namely, a right-hand gear set 56. Rotation of the right-hand gear set 56 will cause rotation of the right axle 14. The left-hand gear set 54 and the right-hand gear set 56 are configured so that they can rotate in unison, when no differential action is required, or rotate relative to one another, when differential action is required.

A cross-section of the differential 10 along line 2—2, as shown in FIG. 2, depicts one embodiment of the present invention wherein two or more center-right planet gears 40a and 40b are uniformly spaced around the circumference of the center-right sun gear 32. The uniform spacing of the center-right planet gears 40a and 40b, in particulars and all of the planet gears, in general, is essential for ensuring a balanced and smooth rotation of all of the gears within the housing 10. The actual number of planet gears placed around the circumference of any one sun gear is generally irrelevant as long as at least two are present, and they are uniformly spaced around the circumference thereof. For example, in FIG. 2, three center-right planet gears 40 could be placed around the circumference of the center-right sun gear 32 as long as the three center-right gears 40 were placed 120 degrees apart along the circumference of the center-right sun gear 32.

FIG. 2 also shows how the center-right planet gears 40a and 40b are rotatably attached to right shafts 44a and 44b, respectively, for concurrent rotation around the circumference of the center-right sun gear 32. The center-right sun gear 32 is rotatably mounted on the floating shaft 52.

FIG. 3, a cross-section of the differential unit 10 along line 3—3, depicts two or more center-left planet gears 38a and 38b spaced uniformly around the circumference of the center-left sun gear 30, which is rotatably mounted on the floating shaft 52. The center-left planet gears 38a and 38b are rotatably attached to left shafts 48a and 48b, respectively, for concurrent rotation around the circumference of the center-left sun gear 30. The number of center-left planet gears 38 may vary, so long as the number of planet gears equals at least two, and the gears are uniformly spaced around the circumference of the center-left sun gear 30.

FIG. 3 also shows the ring gear 22 rigidly attached to the differential housing 10 thereby enabling the housing 10 to rotate simultaneously with the ring gear 22. The drive shaft 24 rotates the pinion gear 26, which in turn drives the ring gear 22. Thus, rotation of the drive shaft 24 results in rotation of the housing 10.

In operation, the drive shaft 24 transmits power to the pinion gear 26, which in turn meshes with and drives the ring gear 22. The embodiment of the present invention shown in FIG. 3 depicts a drive shaft 24/pinion gear 26/ring gear 22 combination for a front-wheel drive vehicle. This configuration can be easily modified so that the inventive differential can be used in a rear-wheel drive vehicle.

The ring gear 22 is rigidly attached to the circumference of the differential housing 10 so that the ring gear 22 and the housing 10 rotate simultaneously. As the pinion gear 26 rotates the ring gear 22, it effectively results in the transmission of power to the housing 10.

When the housing 10 rotates it drives the left sun gear 28 and the right sun gear 34, which in turn transmit torque to the left-hand gear set 54 and the right-hand gear set 56, respectively.

When a vehicle is driven in a straight path, the torque delivered to the housing 10 is divided equally between the left-hand gear set 54 and the right-hand gear set 56, which in turn drive the left axle 12 and the right axle 14, respectively. In these instances, there is no relative movement between the gears and the housing 10 itself, so that the left-hand gear set 54, the right-hand gear set 56 and the housing 10 all rotate in unison.

When a vehicle is driven around a curve the inventive differential operates essentially as a standard differential by enabling the wheels to rotate at different rates. The left-hand gear set 54 and the right-hand gear set 56 can rotate relative to each other, thereby allowing the wheels of a vehicle to rotate at different rates when required.

If one of the wheels slips or loses traction then the "one-way drive" gear configuration results in "gear lockup". "Gear lockup" results because there are no feedback forces being sent to the housing via the left 12 or right axle 14 from the wheel which is slipping. Thus, all of the available torque goes to the one wheel which continues to maintain traction with the road, however, while the wheel with no traction will continue to keep rotating with the driven wheel as if on a common axle.

Referring to FIG. 1, the following formula develops the typical ratios required of the left hand gear set 54 and the right hand gear set 56 to satisfy the self-locking objective and differential characteristics of the inventive differential:

$$R = \frac{1}{1 - \frac{N_3 \times N_1}{N_4 \times N_2}}$$

For example, given the following number of gear teeth for the respective gears of the right hand gear set 56:

right sun gear (34)=$N_1$=32 teeth
right planet gear (42)=$N_2$=25 teeth
center-right planet gear (40)=$N_3$=24 teeth
center-right sun gear (32)=$N_4$=33 teeth Additionally, assuming that the center-right sun gear 32 is an output gear for the right-hand gear set 56, then 14.5 rotations of the right axle 14 will produce 1 rotation of the center-right sun gear, as seen below in Formula A. This ratio will enable the "gear lockup" of the right-hand gear set 56 to be overcome.

$$R = \frac{1}{1 - \frac{24 \times 32}{33 \times 25}} = 14.5:1 \qquad \text{FORMULA A}$$

Given the following number of gear teeth for the respective gears of the left hand gear set 54:

left sun gear (28)=$N_1$=25 teeth
left planet gear (36)=$N_2$=32 teeth center-left planet gear (38)=$N_3$=33 teeth
center-left sun gear (30)=$N_4$=24 teeth Additionally, assuming that the center-left sun gear 30 is an output gear for the left-hand gear set 54, then 13.5 rotations of the left axle 12 will produce 1 rotation of the center-left sun gear 30, as seen in Formula B below. This ratio will enable the "gear lockup" of the left-hand gear set 54 to be overcome.

$$R = \frac{1}{1 - \frac{33 \times 25}{24 \times 32}} = -13.5:1 \qquad \text{FORMULA B}$$

With a conventional bevel gear differential, if the drive wheels are lifted off the ground, and, while the housing remains stationary, one of the wheels is rotated, the other wheel will rotate at the exact same speed, but in a direction opposite of the wheel being rotated. The results of Formulas A and B indicate that a similar type outcome is achieved with the inventive differential.

The −13.5:1 and 14.5:1 ratios achieved by Formulas A and B are merely utilized to provide an example of how the gear sizes of the left-hand gear set 54 and the right-hand gear set 56 may be manipulated to maximize the drive characteristics of the inventive differential, and should not limit the broad scope of ratios which can be obtained utilizing the formulas.

An inherent feature of the inventive differential is its ability to cancel out the effects of "torque steer", which occurs when a front-wheel drive vehicle is operated at high speeds. Torque steer results when the biasing forces of a differential in motion are multiplied as the differential rotates at higher rates of speed. As a result, a front wheel drive vehicle may tend to pull to the right or left when operated at high speeds, thereby forcing the driver to constantly correct the path of his vehicle. Based on the above calculations, it can be seen that the torque forces on the left-hand gear set 54 and the right hand gear set 56 can be adjusted.

By manipulating the size of the gears, the output ratio of the left-hand gear set 54 can be established at a slightly different level than the output ratio of the right-hand gear set 56. This difference in the torque ratios enables the housing 10 to inherently cancel out the effects of torque steer.

Generally, the configuration produces a non-slip differential without the need for clutches or complex gearing, producing a differential which operates at all times, with no interim time period between loss of traction by one drive wheel and commencement of the limited slip gear means.

It is well understood that any reference to "left" and "right" directions within the differential housing is merely for the convenience of those skilled in the art, so that they may better understand the inventive configuration. The references to "left" and "right" do not, and should not limit the scope of the invention. For example, an operable device would exist if all references in the specification and claims to "left" were changed to "right" while all references to "right" were changed to "left".

The invention in its broader aspects is not limited to the specific details shown and described, and departures may be made from such details without departing from the principles of the invention and without sacrificing its chief advantages.

I claim:

1. A differential for transmitting rotational power to the left and right axles of a vehicle whereby the torque output between the right and left axles can be biased or varied, comprising:

a differential housing which rotates about a central axis, the housing having spaced left and right walls transverse to the central axis;

a left axle section extending through the left wall of the housing and a right axle section extending through the right wall of the housing, the left and right axle sections being coaxial with the central axis and rotatable relative to the housing;

a right sun gear coaxial with the central axis and drivably connected to the right wall of the housing for rotation therewith relative to the right axle;

a left sun gear coaxial with the central axis and drivably connected to the left wall of the housing for rotation therewith relative to the left axle;

a center-left sun gear and a center-right sun gear coaxial with the central axis and disposed between the left sun gear and the right sun gear, the center-left and center-right sun gears being drivably connected for concurrent rotation about the central axis;

two or more right planet gears meshing with the right sun gear and rotatable around the circumference thereof;

two or more center-right planet gears meshing with the center-right sun gear and rotatable around the circumference thereof;

two or more center-left planet gears meshing with the center-left sun gear and rotatable around the circumference thereof;

two or more left planet gears meshing with the left sun gear and rotatable around the circumference thereof;

each of the right planet gears being paired with an associated center-right planet gear, the pair being drivably connected to a common right shaft for concurrent rotation;

each of the left planet gears being paired with an associated center-left planet gear, the pair being drivably connected to a common left shaft for concurrent rotation;

means for drivably connecting the left shaft to the left axle section; and means for drivably connecting the right shaft to the right axle section.

2. The differential of claim 1, wherein a left gear set comprises the left sun gear, the left planet gear, the center-left planet gear, and the center-left sun gear.

3. The differential of claim 1, wherein a right gear set comprises the right sun gear, the right planet gear, the center-right planet gear, and the center-right sun gear.

4. The differential of claim 1, wherein a ring gear is drivably attached to the differential housing for transmitting rotational power to the differential housing.

5. The differential of claim 1, wherein the center-right sun gear and the center-left sun gear are rotatably mounted on a floating shaft disposed between the right axle section and the left axle section.

6. The differential of claim 1, wherein:
there is a plurality of left planet gears and center-left planet gears; and
each left planet gear is paired with a center-left planet gear, the paired left and center-left planet gears being coaxial.

7. The differential of claim 1, wherein:

there is a plurality of right planet gears and center-right planet gears; and each right plant gear is paired with a center-right planet gear, the paired right and center-right planet gears being coaxial.

8. The differential of claim 1, wherein:

one of the left and right sun gears being smaller than the associated at least one left and right planet gear and the other of the left and right sun gears being larger than the associated at least one left and right planet gear; and the at least one center-left planet gear or center-right planet gear being smaller than the associated vertically opposed center-left or center-right sun gear and the at least one center-left or center-right planet gear being larger than the associated vertically opposed center-left or center-right sun gear.

9. The differential of claim 1, wherein: the rotational forces of the gears counteract the effects of torque steer which occur when a front wheel drive vehicle is operated at high loads.

10. The differential of claim 1 wherein the two or more left planet gears are uniformly spaced around the circumference of the left sun gear.

11. The differential of claim 1 wherein the two or more center-left planet gears are uniformly spaced around the circumference of the center-left sun gear.

12. The differential of claim 1 wherein the two or more center-right planet gears are uniformly spaced around the circumference of the center-right sun gear.

13. The differential of claim 1 wherein the two or more right planet gears are uniformly spaced around the circumference of the right sun gear.

14. The differential of claim 1 wherein the means for drivably connecting the right shaft to the right axle is a right axle extension.

15. The differential of claim 1 wherein the means for drivably connecting the left shaft to the left axle is a left axle extension.

* * * * *